US006983705B1

(12) United States Patent
Gust

(10) Patent No.: US 6,983,705 B1
(45) Date of Patent: Jan. 10, 2006

(54) DEPTH CONTROL MECHANISM

(75) Inventor: Jacob N. Gust, Fargo, ND (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 11/086,044

(22) Filed: Mar. 22, 2005

(51) Int. Cl.
A01C 5/00 (2006.01)
(52) U.S. Cl. .......................................... 111/52; 111/167
(58) Field of Classification Search ................ 111/136, 111/163–169, 157, 149, 52, 134–137; 172/430, 172/536
See application file for complete search history.

(56) References Cited

U.S. PATENT DOCUMENTS

| 4,009,668 A | 3/1977 | Brass et al. ................... 111/85 |
| 4,374,500 A | 2/1983 | Westerfield .................... 111/85 |
| 4,413,685 A | 11/1983 | Gremelspacher et al. ... 172/316 |
| 5,081,942 A | 1/1992 | Clark et al. .................. 111/136 |
| 5,235,922 A | 8/1993 | Deckler ....................... 111/137 |
| 5,443,125 A | 8/1995 | Clark et al. ................. 172/608 |
| 5,595,130 A | 1/1997 | Baugher et al. .............. 111/52 |

Primary Examiner—Christopher J. Novosad
(74) Attorney, Agent, or Firm—Rebecca Henkel

(57) ABSTRACT

A depth control mechanism for an agricultural seed planter is made up of an index plate, a T-handle, a spring, and a gauge wheel arm. The T-handle is moved into different positions which are indicated in the index plate. The spring and the gauge wheel arm allow for selective manual movement and locking of the depth adjustment.

18 Claims, 3 Drawing Sheets

DEPTH CONTROL MECHANISM

BACKGROUND OF THE INVENTION

The present invention relates generally to agricultural planting equipment, and more specifically to depth gauging systems on disk openers and the like.

Furrow depth or the planting of seeds in a furrow (which is the vertical distance therefrom to the top of the uniform soil covering of the seeds) is critical for successful crop production. Most planters, therefore, require a structure that will provide accurate furrow depth control. Most commonly dual disk openers are used to create the furrow for the seed deposited therein via a seed tube, with a gauge wheel positioned adjacent but outward to each disk with the wheel axis rearward of the disk axis and generally in line where the disk exits the soil. Various structures may be utilized to close the furrow. The gauge wheels are rotatably mounted on arms which are pivotally mounted on the planter frame. By moving the arms in one direction the gauge wheel position relative to the frame are changed exposing less of the disks to decrease furrow depth. Movement in a contrary direction increases furrow depth by exposing more of the disks.

The farmer of today is by necessity a businessman who must compete in the economic marketplace. To effectively compete, a farmer must realize high yields from his fields. Such yields require that seeds planted germinate early and emerge uniformly and healthfully. An optimum planting depth depends on seed type and soil type and condition. With the advent of multiple row high speed planter capable of sowing considerable acreage in short periods of time, the likelihood of encountering varying soil types during a single sustained operation and/or over short time spans has increased. The ability to quickly and easily adjust seed planting dept to appropriate parameters for changing conditions has become correspondingly important.

Tillage and planting systems typically include a furrow opener, for opening the soil and depositing seed in a furrow, and a trailing press wheel for firming the soil around the seed and maintaining the proper opener depth. A press wheel arm includes a forward end pivotally connected to the opener body and a rearward end supporting the press wheel. The angle of the arm relative to the opener body is adjustable to vary the planting depth as desired for differing soil conditions and seed types. Presently available depth gauging systems include threaded and gear types, and pin and clip types wherein parts are first removed to readjust the angle and then are reinstalled after the gauging wheel is repositioned. The threaded and gear types require much time to adjust from one end of the range to the other end, and with use often become very hard to manipulate because of corrosion. Most pin and clip types have loose parts which are easily lost and are also time consuming to adjust and reinstall. Some other types of depth adjustment devices often have more than one pivot point, have contact points that change with adjustments in depth and do not provide a uniform adjustment over the range of settings. Commonly, the gauge wheel arm must be physically moved to make adjustments.

It would be advantageous to provide a depth control mechanism that would more accurately create a furrow at a uniform depth and allow for easy adjustment by the operator, thus relieving the farmer/operator of the previous manual manipulation involved in the process.

SUMMARY OF THE INVENTION

Accordingly, It is an object of the instant invention to provide an improved depth gauging adjustment for an agricultural implement such as a disk opener.

It is an object of the instant invention to provide a depth control system that includes an index plate, and index handle, a spring, and a gauge wheel arm.

It is another object of the instant invention to provide a gauge wheel arm that will be free floating about its spindle axis and will not be permanently fixed to any depth position.

It is yet another object of the instant invention to provide a gauge wheel, that when in working position, will rotate until it hits the index handle.

It is a further object of the instant invention to provide such an adjustment which overcomes the problems mentioned in the background.

It is an object of the instant invention to provide a depth control system that allows for the adjustment of the seed planting depth of a planter from the operator's positions, while planting a field.

It is another object of the instant invention to provide an enhanced depth control mechanism that is easily manipulated with one hand and does not require removal and reinstallation of parts.

It is a further object of the instant invention to provide a depth control mechanism that is easily adjusted with simple motions and that provides uniform and accurate incremental depth adjustments.

It is an object of the present invention that the depth control mechanism is easy for the operator to access in order to make adjustments.

It is a further object of the present invention to also provide such an adjustment that is compact, simple in construction and reliable in operation.

It is another object of the instant invention to provide a depth control mechanism that may be installed on existing equipment as a retrofit, or installed on new equipment.

It is a still further object of the instant invention to provide a depth control mechanism that is durable in construction, inexpensive to manufacture, carefree of maintenance, facile in assemblage, and simple and effective in use.

These and other objects are obtained by providing a depth control mechanism that is constructed of a steel design. The mechanism is made up of an index plate, a T-handle, a spring, and a gauge wheel arm. The T-handle is moved into different positions which are indicated in the index plate. The spring and the gauge wheel arm allow for selective manual movement and locking of the depth adjustment.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of understanding and use of the invention by a person skilled in the art, and they will not therefore be discussed in significant detail. Also, any reference herein to the terms "left" or "right" are used as a matter of mere convenience, and are determined by standing at the rear of the mechanism facing in its normal direction of travel. Furthermore, the various components shown or described herein for any specific application of this invention can be varied or altered as anticipate by this invention and the practice of a specific application of any element may already be widely known or used in the art by persons skilled in the art and each will likewise not therefore be discussed in significant detail.

Figure 1:
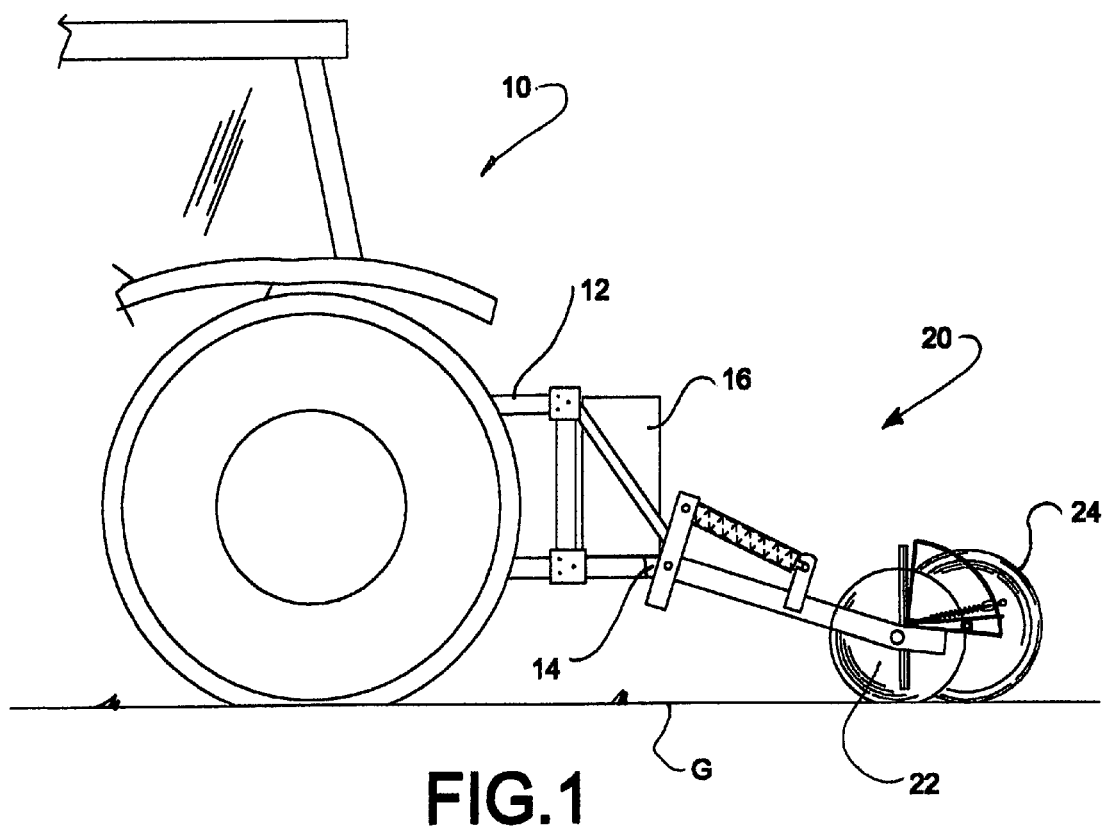
FIG. 1 is a partial side perspective view of a tractor with a depth control system.

Referring now to FIG. 1, the present invention will be described in the context of an exemplary agricultural tractor 10 including an agricultural implement attached to a pair of lift arms 12 (only one shown) thereof. The implement generally includes a toolbar 14, at least one seed bin 16 and at least one seed planter assembly, or row unit, 20. More practically, a plurality of row units 20 are mounted side by side on the toolbar 14, with each row unit being adapted to deposit a single row of seed in the ground as the machine advances; however, for purposes of this disclosure, only a single row unit 20 is illustrated herein. Toolbar 14 is generally an elongate rigid bar that extends perpendicular to the direction of travel of the tractor 10. Bin 16 is generally mounted above toolbar 14 while assembly 20 is mounted below the toolbar when in the operating position, and may be pivoted up into a position generally above the toolbar when in a stowed or transport position. When in the operating position illustrated in FIG. 1, an opening or trenching disc 22 cuts a furrow in the ground G over which tractor 10 travels as the row unit is pulled across the field. A gauge wheel 24 rides over the soil and limits furrow depth as described in greater detail below. The present invention relates to the depth setting mechanism associated with gauge wheel 24.

Figure 2:
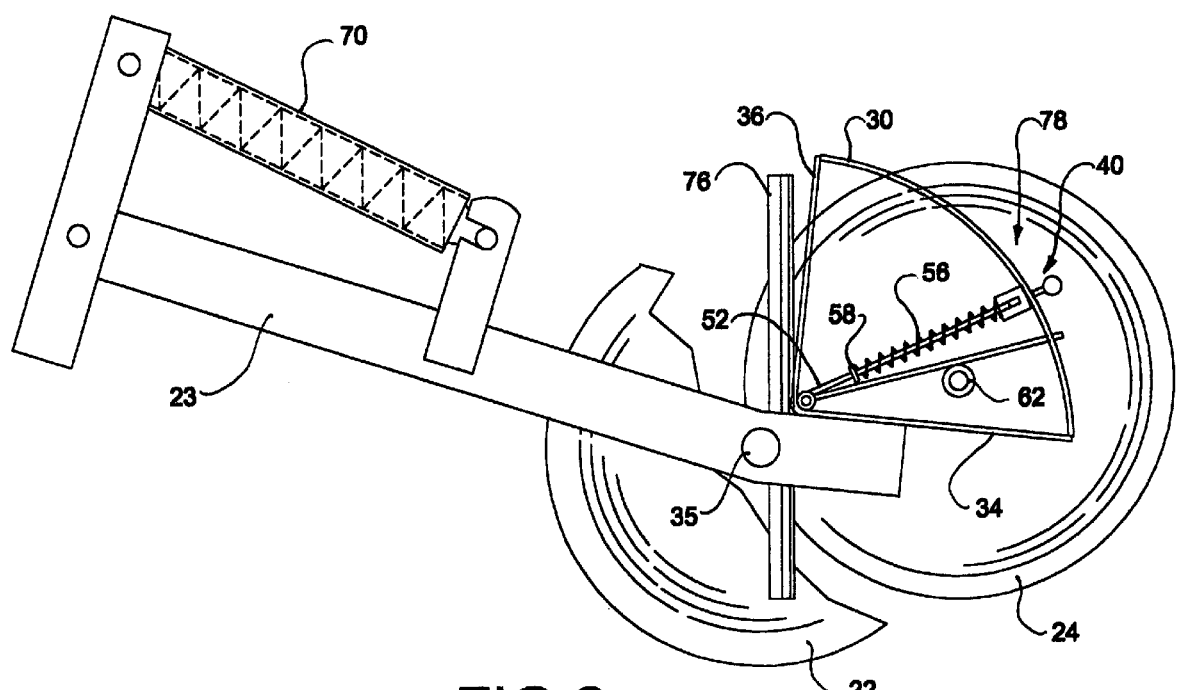
FIG. 2 is a partial perspective side view of one embodiment of the depth control mechanism of the instant invention, with parts broken away for clarification.

Referring now more specifically to FIG. 2, an exemplary assembly 20, with the depth setting mechanism of the instant invention, is illustrated in greater detail and includes, generally, a row unit pivot arm 23, a biasing mechanism 70 to force the assembly into contact with the ground, an opening disc 22, a seed tube 76, a depth setting mechanism 78, and a gauge wheel 24. The construction and general operation of disc 22, seed tube 76 and gauge wheel 24 are well known in the art and therefore will not be described here in detail. With respect to gauge wheel 24, it should suffice to say that wheel 24 may be made from composite elements, such as a tire rim formed from metal or plastic, connected by a suitable fastener and having a semi-pneumatic tire disposed about its periphery. The semi-pneumatic tire helps reduce side-wall compaction of the seed trench while allowing the gauge wheel 24 to move toward and away from the ground as the depth adjustment mechanism is operated.

A disc scraper may be employed in this structure for use under certain field conditions, but since such device is well known in the art, none is shown herein.

Seed tube 76 is a hollow cylindrical member that is linked to the interior of seed bin 16 (see FIG. 1) for receiving metered seed from the bin and depositing the seed into a seed trench formed by disc 22.

FIGS. 2 through 5 show the preferred embodiment of the depth setting mechanism to include an arcuate index plate 30 which contains multiple transverse notches 32 spaced along the circumference thereof which indicate different available depth options. The notches 32 are interconnected by an elongate slot 33 that extends above the upper notch and below the lowest notch. Index plate 30 is attached near the opposing ends thereof to a metal support structure that includes first and second interconnected support arms 34 and 36, the former of which is rigidly connected to and supported by row unit pivot arm 23. Pivot arm 23 further provides a generally horizontal axis point (axle transverse to general direction of travel) 35 for trenching disc 22. The connection point, or point of intersection, 38 (see FIG. 3) between support arms 34 and 36, is generally the center of the radius of the arc of index plate 30. This permits a convenient hinge point (closely adjacent to this connection point) for rotation of the shift arm 52 and gauge wheel arm 60 that creates a generally constant distance between the hinge point 54 and index plate 30. The index handle mechanism 40 comprises a stop block 42 with a T-handle 44 affixed to one end thereof. Partway along the longer leg 46 of T-handle 44 there is affixed a transverse locking bar 48 that has a step-shape with a land 49. The upper part of the locking bar is sized to fit snugly into the various transverse slots 32 while land 49 engages the under side of index plate 30, thus locking the locking bar in position and fixing the depth of the opening disc 22. The diameter of leg 46 is such that it may easily slide within vertical slot 33, and to promote quick and unencumbered movement from slot to slot, the diameter of leg 46, and the width of slot 33, would be selected to be larger than the width (vertical dimension in FIG. 4) of notch 32.

Stop block 42 includes an axial hole 50 therein in general alignment with the longitudinal axis of leg 46 of the T-handle. As can best be seen in FIG. 3, a shift arm 52 is pivotably fixed at hinge axis 54. The outer end of shift arm 52 extends into hole 50 in stop block 42. A spring 56 is slightly compressed between spring stop 58 that is affixed to shift arm 52, and the bottom surface of stop block 42, thus pushing the top of stop block 42 toward index plate 30 and locking bar 48, when properly aligned, into one of the notches 32. The depth of hole 50, the length of shift arm 52, the relative location of index plate 30 and locking bar 48 are such that by pushing on the T-handle 44, shift arm 52 moves further into hole 50, further compressing spring 56 and causing disengagement of locking bar 48 and one notch, allowing the depth to be changed. Upon movement of the T-handle to a different notch and release of pressure on the T-handle, the locking bar 48 is pushed back into a locking position on the index plate.

Figure 3:
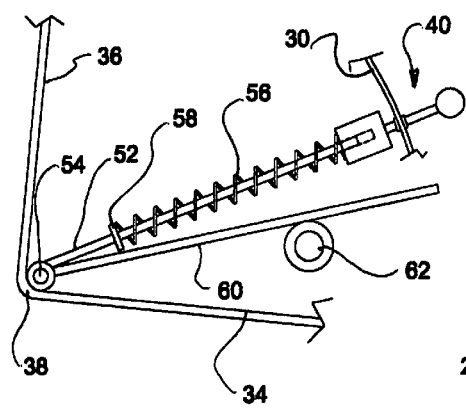
FIG. 3 is a partial side perspective view of the adjustment mechanism of depth control mechanism of the instant invention.
Figure 4:
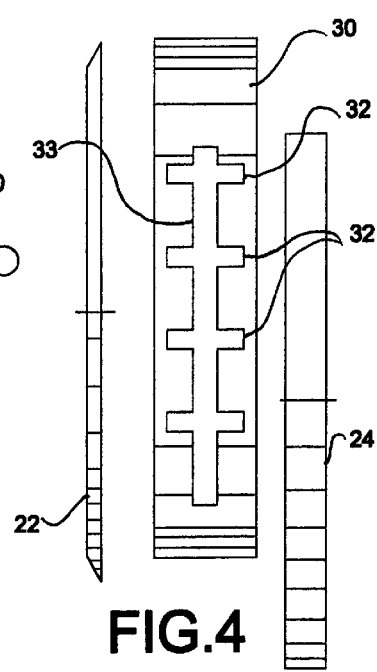
FIG. 4 is a partial top rear oblique perspective view of some components of the depth control mechanism of the instant invention.
Figure 5:
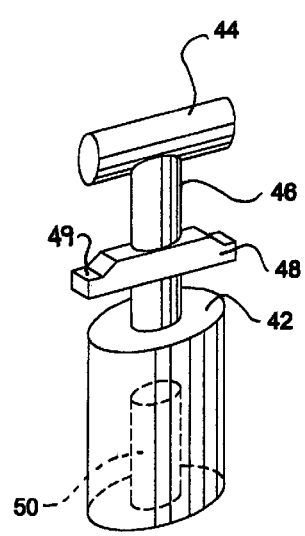
FIG. 5 is a perspective view of the index handle and shaft of the depth control mechanism of the instant invention.

A gauge wheel arm 60 is free floating about hinge axis 54 and includes a spindle axis 62 for gauge wheel 24, and is not permanently fixed to any one depth position. Thus, when a depth is selected by the depth setting mechanism, gauge wheel arm 60 is fixed insofar as spindle axis 62 cannot be moved any higher than the depth setting mechanism will permit. Specifically, while downward movement is not encumbered, gauge wheel arm 60 is prevented from moving upwardly by engagement of arm 60 with the spring biased mechanism described in the immediately preceding paragraphs. FIG. 3 shows that arm 60 engages spring 56, and, of course, that will work satisfactorily; however, one of skill in the art will readily realize that other structures may be more durable, such as, for example, to reshape arm 60 so that it engages stop block 42 rather than spring 56. Engagement arm 60 may be supported somewhat on the outer end thereof, or not, depending upon the materials of which it is constructed. For instance, some stability may be added if arm 60 extends outwardly through slot 33.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Accordingly, the following claims are intended to protect the invention broadly as well as in the specific form shown.

Having thus described the invention, what is claimed is:

1. A row furrow opener assembly for an agricultural seed planter, comprising:
 a pivot arm with a first end for vertical pivotable attachment to a tractor toolbar and a second generally remote opposing second end;
 a disc opener rotatably affixed at an axis point on said pivot arm adjacent said second end thereof;
 a depth control mechanism affixed to said pivot arm adjacent said second end thereof, said depth control mechanism comprising:
  a generally wedge-shaped structure with a curved arcuate index plate having first and second opposing ends and first and second support arms, said support arms each with a first end and a second opposing end, said first ends of said support arms interconnected at an intersection point and said second ends connected to respective said first and second ends of said index plate, said intersection point generally at the center of the radius of the curved arcuate index plate;
  said index plate having a longitudinal slot along the arc thereof and a plurality of notches spaced along said longitudinal slot generally transverse to said longitudinal slot, each said slot and said notches having length and width dimensions;
  said first support arm affixed to said pivot arm;
  an elongate shift arm affixed to said wedge-shaped structure for pivotable movement generally between said first and second support arms about a first axis adjacent said intersection point;
  said shift arm having a locking mechanism for selectively engaging said notches; and
  a gauge wheel arm affixed to said wedge-shaped structure for pivotable movement generally between said first support arm and said shift arm about said first axis, said gauge wheel arm having a spindle axle affixed thereto and a gauge wheel mounted for rotation on said spindle axle, whereby said locking mechanism can be selectively moved between said plurality of notches to modify the position of said spindle axle relative to said axis point of said disc opener and thus the depth at which said disc opener engages the ground.

2. The assembly of claim 1, further including:
 a first biasing mechanism connected to said pivot arm pushing said pivot arm in a clockwise direction.

3. The assembly of claim 2, wherein said index plate has a first concave side toward said intersection point and a second opposing convex side, said shift arm has a first end pivotably affixed at said first axis and a remote second end, and said locking mechanism further comprises:
 a stop block having a first end with an elongate hole therein slidingly fitted over said second end of said shift arm, and a remote second end, said stop block located on said concave side of said index plate;
 a handle shaft having a cross-sectional width and a first end rigidly affixed to said second end of said stop block generally parallel to said shift arm, and a remote second end, said cross-sectional width of said handle shaft being a smaller dimension than the width dimension of said slot, said handle shaft extending through said longitudinal slot in said index plate;
 a transverse locking bar rigidly affixed to said handle shaft and extending transversely thereto, said locking bar having an overall length and width to fit into any of said plurality of notches;
 a handle affixed to said handle shaft;
 a second biasing mechanism pushing said locking block away from said first axis.

4. The assembly of claim 3, wherein:
 said shift arm has a stop ring rigidly affixed thereto and said second biasing mechanism comprises a compression spring surrounding said shift arm and somewhat compressed between said stop ring and said first end of said stop block, pushing said stop block toward said concave side of said index plate and said locking bar into one of said plurality of notches.

5. The assembly of claim 4, wherein:
 said shift arm is generally rod-shaped.

6. The assembly of claim 5, wherein:
 said locking bar us formed with an upper part that fits within any of said plurality of notches, and a lower part that has a length dimension that engages the concave side of said index plate and prevents the locking bar from passing fully through said notches.

7. The assembly of claim 6, wherein:
 said handle is T-shaped.

8. The assembly of claim 7, wherein:
 said cross-sectional width dimension of said handle shaft is larger than the width dimension of said plurality of notches.

9. In a row furrow opener assembly for an agricultural seed planter, said seed planter including a pivot arm with a first end for vertical pivotable attachment to a tractor toolbar and a second generally remote opposing second end, a disc opener rotatably affixed at an axis point on said pivot arm adjacent said second end thereof, and a depth control mechanism affixed to said pivot arm adjacent said second end thereof, the improvement in said depth control mechanism comprising:
 a generally wedge-shaped structure with a curved arcuate index plate having first and second opposing ends and first and second support arms, said support arms each with a first end and a second opposing end, said first ends of said support arms interconnected at an intersection point and said second ends connected to respective said first and second ends of said index plate, said intersection point generally at the center of the radius of the curved arcuate index plate;
 said index plate having a longitudinal slot along the arc thereof and a plurality of notches spaced along said longitudinal slot generally transverse to said longitudinal slot, each said slot and said notches having length and width dimensions;

said first support arm affixed to said pivot arm;

an elongate shift arm affixed to said wedge-shaped structure for pivotable movement generally between said first and second support arms about a first axis adjacent said intersection point;

said shift arm having a locking mechanism for selectively engaging said notches; and a gauge wheel arm affixed to said wedge-shaped structure for pivotable movement generally between said first support arm and said shift arm about said first axis, said gauge wheel arm having a spindle axle affixed thereto and a gauge wheel mounted for rotation on said spindle axle, whereby said locking mechanism can be selectively moved between said plurality of notches to modify the position of said spindle axle relative to said axis point of said disc opener and thus the depth at which said disc opener engages the ground.

10. The improvement of claim 9, further including:

a first biasing mechanism connected to said pivot arm pushing said pivot arm in a clockwise direction.

11. The assembly of claim 9, wherein said index plate has a first concave side toward said intersection point and a second opposing convex side, said shift arm has a first end pivotably affixed at said first axis and a remote second end, and said locking mechanism further comprises:

a stop block having a first end with an elongate hole therein slidingly fitted over said second end of said shift arm, and a remote second end, said stop block located on said concave side of said index plate;

a handle shaft having a cross-sectional width and a first end rigidly affixed to said second end of said stop block generally parallel to said shift arm, and a remote second end, said cross-sectional width of said handle shaft being a smaller dimension than the width dimension of said slot, said handle shaft extending through said longitudinal slot in said index plate;

a transverse locking bar rigidly affixed to said handle shaft and extending transversely thereto, said locking bar having an overall length and width to fit into any of said plurality of notches;

a handle affixed to said handle shaft;

a second biasing mechanism pushing said locking block away from said first axis.

12. The improvement of claim 11, wherein:

said shift arm has a stop ring rigidly affixed thereto and said second biasing mechanism comprises a compression spring surrounding said shift arm and somewhat compressed between said stop ring and said first end of said stop block, pushing said stop block toward said concave side of said index plate and said locking bar into one of said plurality of notches.

13. The assembly of claim 12, wherein:

said shift arm is generally rod-shaped.

14. The assembly of claim 13, wherein:

said locking bar us formed with an upper part that fits within any of said plurality of notches, and a lower part that has a length dimension that engages the concave side of said index plate and prevents the locking bar from passing fully through said notches.

15. The assembly of claim 14, wherein:

said handle is T-shaped.

16. The assembly of claim 14, wherein:

said cross-sectional width dimension of said handle shaft is larger than the width dimension of said plurality of notches.

17. The improvement of claim 16, further including:

a first biasing mechanism connected to said pivot arm pushing said pivot arm in a clockwise direction.

18. The assembly of claim 17, wherein:

said handle is T-shaped.

* * * * *